(12) United States Patent
Lee (10) Patent No.: US 7,206,104 B2
(45) Date of Patent: Apr. 17, 2007

(54) METHOD FOR AUTOMATICALLY DETERMINING DOCUMENT POSITION IN A SCANNER WINDOW

(76) Inventor: Chun-Hung Lee, No. 17, Lane 17, Jen-Ai Rd., Feng Shan, Kaohsiung Hsien (TW)

( * ) Notice: Subject to any disclaimer, the term of this patent is extended or adjusted under 35 U.S.C. 154(b) by 974 days.

(21) Appl. No.: 10/072,887

(22) Filed: Feb. 12, 2002

(65) Prior Publication Data

US 2003/0179421 A1    Sep. 25, 2003

(51) Int. Cl.
*H04N 1/04*     (2006.01)
*H04N 1/40*     (2006.01)
*G06K 9/36*     (2006.01)

(52) U.S. Cl. ............... 358/488; 358/474; 358/449; 382/291

(58) Field of Classification Search ............... 358/488, 358/449, 474; 382/291, 287; 356/615
See application file for complete search history.

(56) References Cited

U.S. PATENT DOCUMENTS 5,245,676 A * 9/1993 Spitz .................... 382/235
6,271,935 B1 * 8/2001 Cook .................... 358/1.9
6,470,099 B1 * 10/2002 Dowdy et al. .............. 382/287
6,791,723 B1 * 9/2004 Vallmajo et al. ............ 358/488

* cited by examiner

*Primary Examiner*—Edward Coles
*Assistant Examiner*—Houshang Safaipour
(74) *Attorney, Agent, or Firm*—Berkeley Law & Technology Group, LLP (57) ABSTRACT

A method for determining the position of a document placed in the scanning widow of a flatbed scanner is disclosed. The method can correctly determine the precise position of a document from a pre-scanned image, including portions of a pressing cover (background color), illuminator (different color from the background) and the document. By color identification, a preliminary range having a rectangular area covering the document and the illuminator is first determined. Then, the colors of the four corners of the preliminary range are identified. Finally, the precise position of the document is determined by color identification, approaching from the rim of the preliminary range toward the the document.

20 Claims, 11 Drawing Sheets

METHOD FOR AUTOMATICALLY DETERMINING DOCUMENT POSITION IN A SCANNER WINDOW

BACKGROUND OF THE INVENTION

1. Field of the Invention

The invention generally relates to an automatic method for a scanner, and more particularly relates to a method for determining the position of a document placed in the scanning widow of a flatbed scanner.

2. Related Art

Automatic methods for a flatbed scanner to determine the position of a document placed on the scanner window are already well known. However, the prior methods are limited to the application of flatbed scanners that have a single background pattern of the scanner window. In other words, the prior method obtains a background image pattern of the scanner window by a pre-scanning process, then the background image pattern (a certain image color) can be omitted later from automatic ranged scanning so as to produce the document image only. When the prior method is applied to a flatbed scanner with two kinds (two colors) of background image pattern, incorrect determining of the document range may occur.

For example, beside a common black or white pressing cover for the flatbed, a conventional scanner may include an illuminator for lighting a transparency or a film for scanning. The illuminator has a color different from that of the pressing cover. Therefore, with the prior method the scanner mistakes the image of the illuminator as a part of the scanned document if only one background color (the color of the pressing cover) is considered. Or, a partial image of the scanned document is cropped if two background colors are considered.

SUMMARY OF THE INVENTION

The object of the invention is therefore to provide a method for determining the position of a document placed on a flatbed scanner in which the background image of the flatbed includes two color regions.

The method of the invention includes two steps for finding the scanned document. The first step is to locate a preliminary range of scanning. The preliminary range is determined from the rim toward the center of the scanner window. The preliminary range is a rectangular area covering the hardware (the illuminator) and the document located within the scanner window. The second step is to determine the portion of the document in the preliminary region by sampling certain points and comparing the relative position of the preliminary range to the center of the illuminator, then determining the precise position of the document by approaching the document in that portion through color identification.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein:

FIGS. 2-1 to 2-5 are examples of scanned images of different sized documents placed in the scanner window;

FIGS. 3-1 to 3-7 are examples of scanned images with documents placed in different portions of the scanner window;

FIGS. 5-1 to 5-5 are examples of preliminary ranges of scanning;

FIGS. 8-1 to 8-28 are examples of relative positions between documents and the illuminator;

FIGS. 9-1 and 9-2 are examples of relative positions of documents to the center of the illuminator;

FIGS. 10-1 to 10-6 are examples of finding out the positions of documents in the preliminary regions.

DETAILED DESCRIPTION OF THE INVENTION

Figure 1:
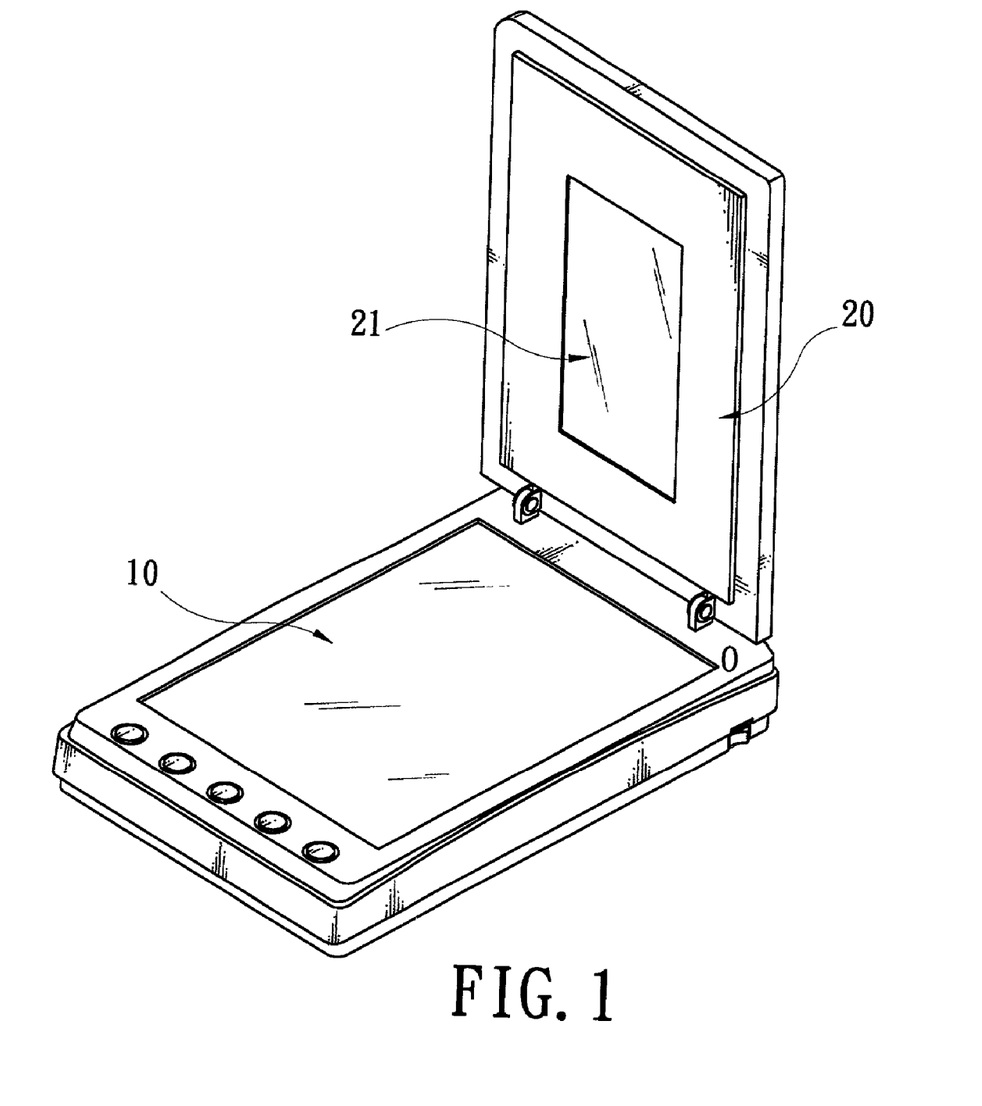
FIG. 1 is a hardware constructional view of a flatbed scanner.

As shown in FIG. 1, a general flatbed scanner 10 includes a scanner window 10 that is usually transparent glass. A pressing cover 20 is removably mounted on the scanner window 10. On the pressing cover 20, at the surface facing the scanner window 10, there is an illuminator 21 for illuminating a transparency, film or the like, for the scanner to obtain an image. The illuminator 21 is usually located in the middle of the pressing cover 20, and has a certain position relative to the scanner window 10. The pressing cover 20 has a specific color, usually black or white, at the surface facing the scanner window 10. Meanwhile, the color of the illuminator 21 is different from that of the pressing cover 20, according to the construction and material thereof.

The size and position of a scanned document D relative to the scanner window 10 and the illuminator 21 influences the result of the automatic determining of document position. Firstly, an example is shown in FIGS. 2-1 to 2-3 in which three different sized documents D are placed under the illuminator 21. The sizes of the documents D are larger than, equal to and smaller than the size of the illuminator 21 in the three figures. In FIG. 2-1, the document D is larger than the illuminator 21 and is positioned to totally cover the range of the illuminator 21, so that only the background color of the pressing cover 20 is exposed on the rim of image of the document D. This is the simplest condition for which the aforesaid prior method can process automatic range-finding correctly. The same condition occurs in FIG. 2-2 that the document D is the same size as the illuminator 21 and is positioned right on the range of the illuminator 21. When the size of the document D is smaller than that of the illuminator 21, the position of the document D partially overlaps the illuminator 21 (as shown in FIG. 3-1), is totally free from the illuminator 21 (as shown in FIG. 3-7), or is fully enclosed in the range of the illuminator 21 (as shown in FIG. 2-3). In these cases, the scanned image includes the colors of the pressing cover 20, the illuminator 21 and the document D.

The image with multiple background colors cannot be correctly processed by the prior method. Therefore, the invention intends to solve this problem and provides a method for determining finding the correct position of document D out of the complex background.

Figures 24, 25:
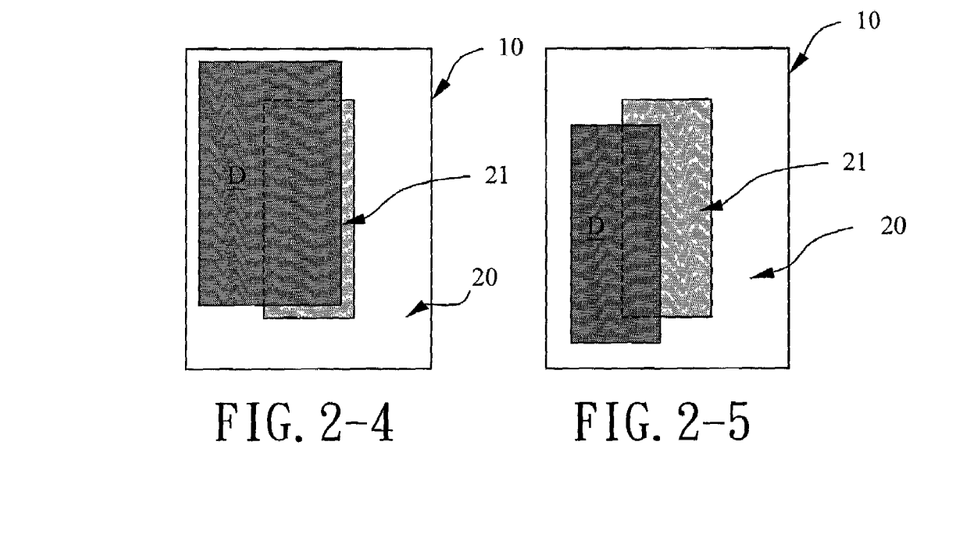
Figures 31, 32:
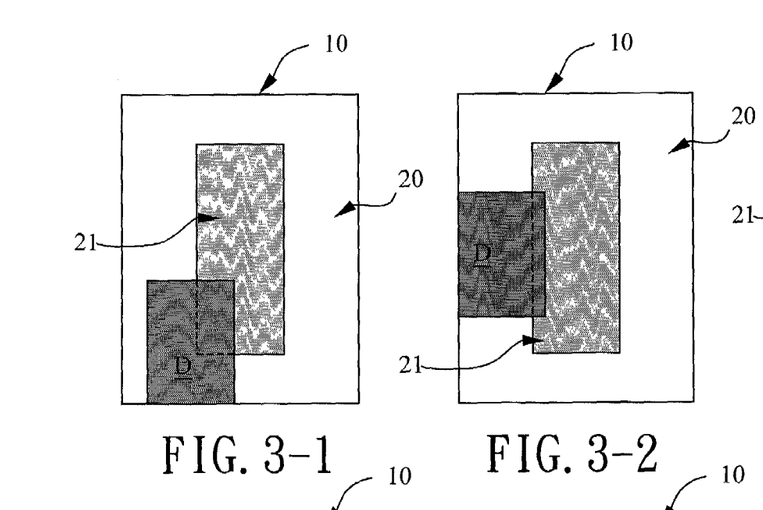
Figures 33, 34:
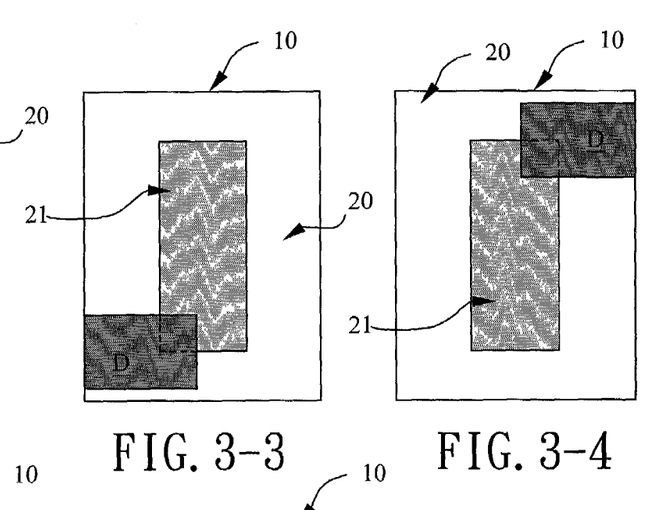
Figures 35, 36, 37:
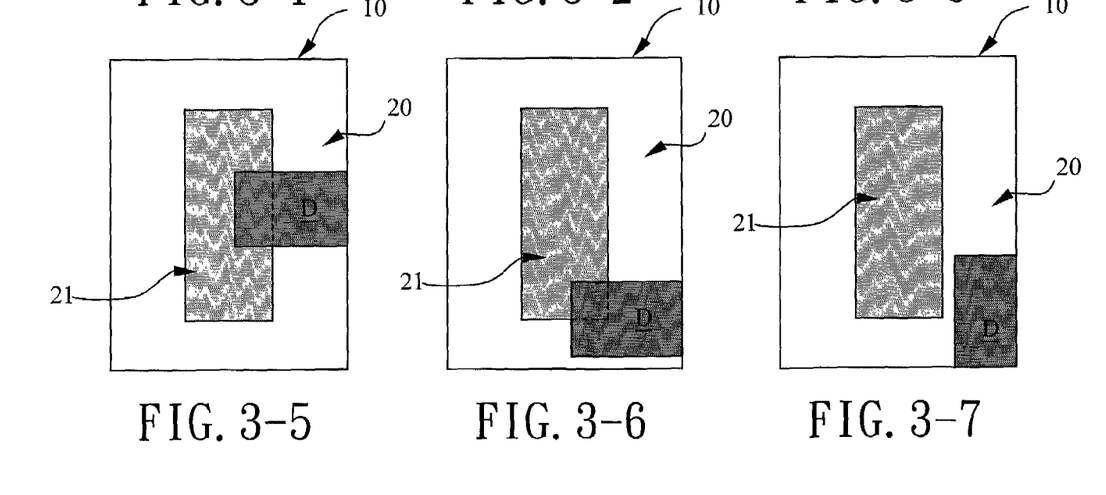
Figure 51:
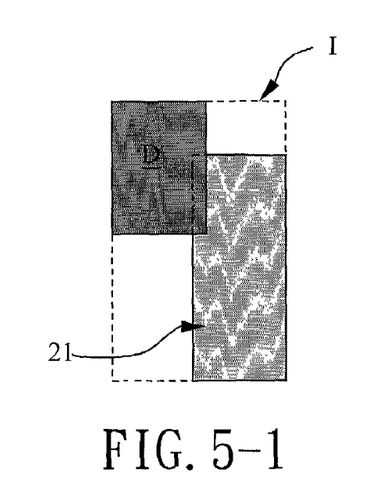
Figure 52:
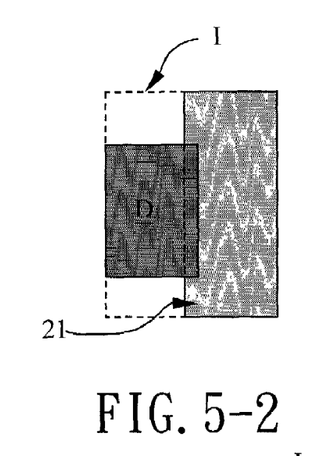
Figure 53:
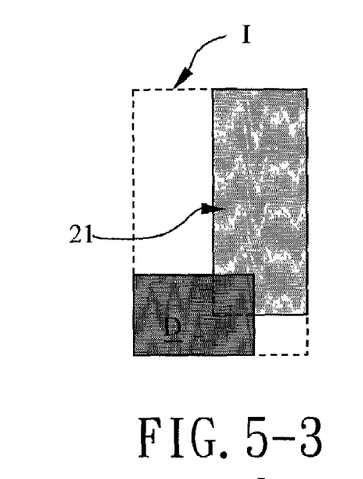
Figure 54:
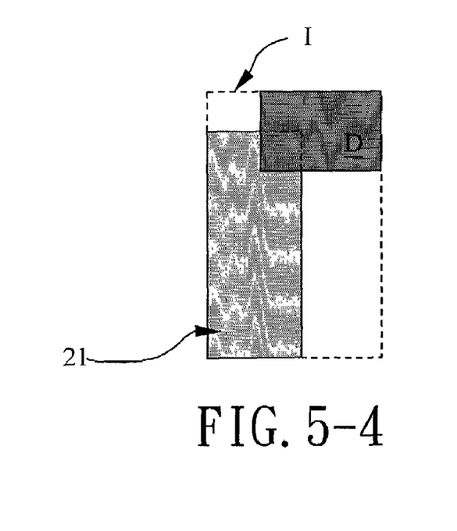
Figure 55:
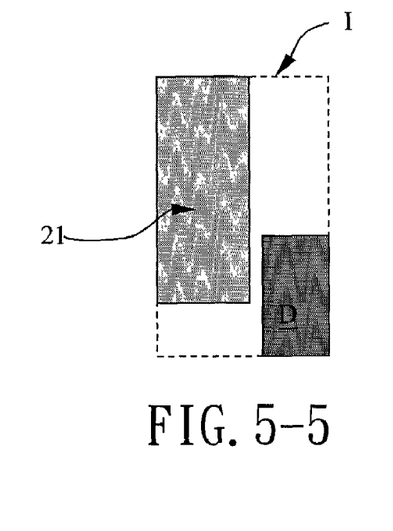
Figures 81, 82:
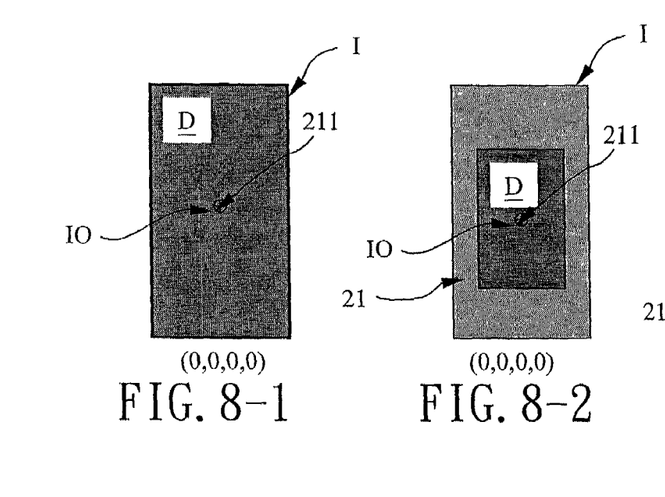
Figures 83, 84:
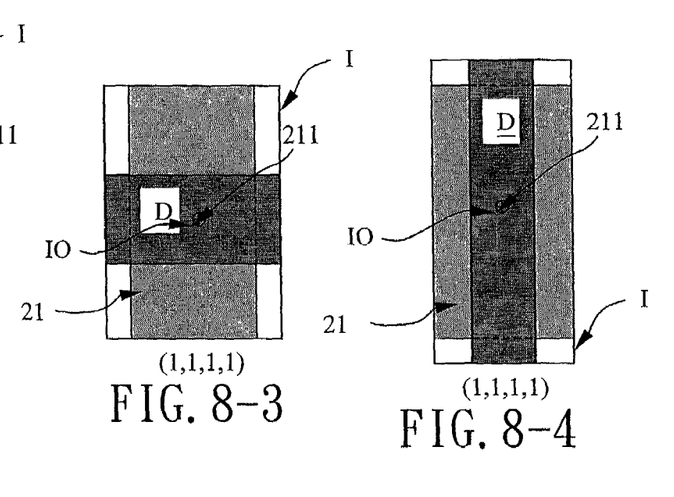
Figures 85, 86, 87, 88:
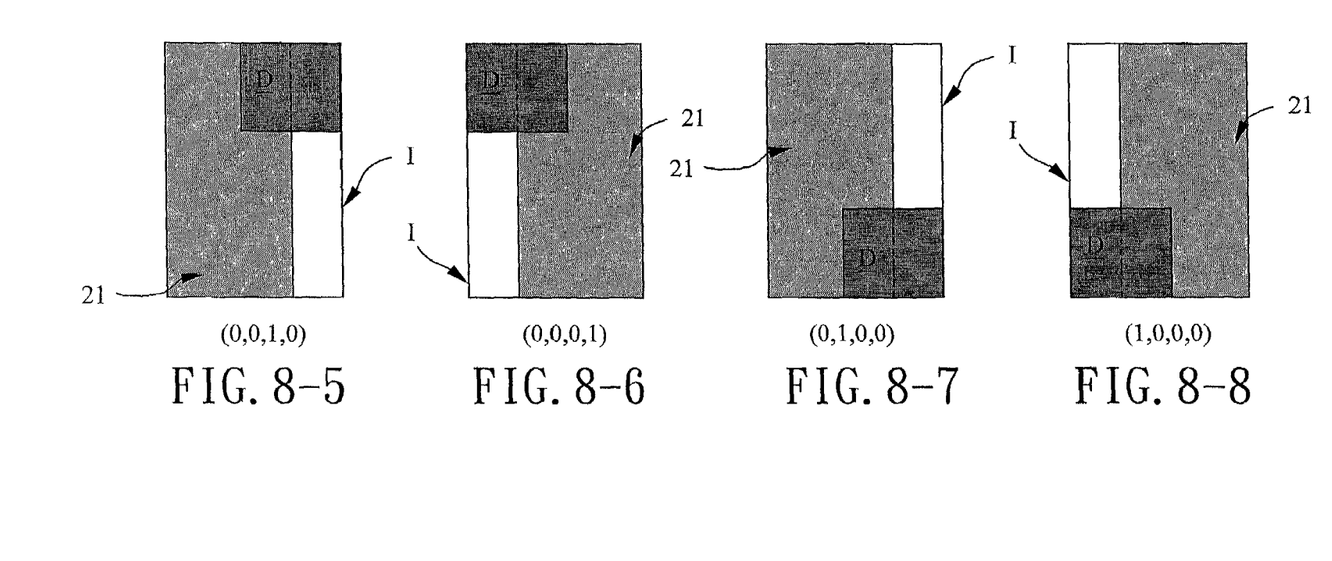
Figures 89, 810:
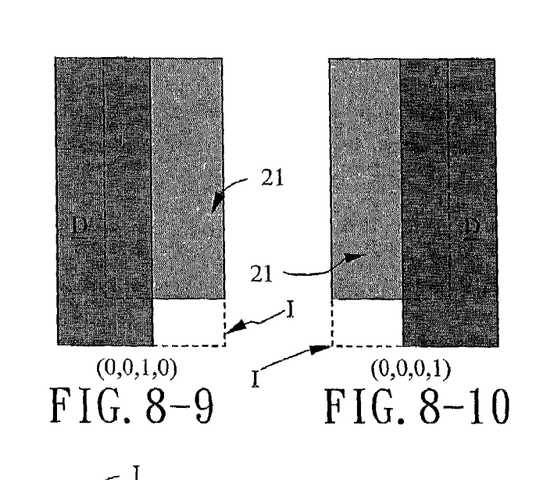

Even when the document D is larger than or the same size as the illuminator 21, it is still possible, as shown in FIGS. 2-4 and 2-5, by the position of the document D, that the scanned image includes colors of the pressing cover 20, the illuminator 21 and the document D, as described above.

The method for determining the position of document D in the scanned image with two background colors according to the invention is described below.

As with a conventional flatbed scanner, the scanner of the invention first pre-scans the scanner widow 10 with a document D placed thereon, and obtains a pre-scanned image that includes images of the pressing cover 20, the illuminator 21 and the document D. FIGS. 3-1 to 3-7 are examples of pre-scanned images in which the documents D are placed in different portions of the scanner window.

After obtaining the pre-scanned image, the invention processes the following steps to locate the position of the document D. The process is described in reference to the flowchart of FIG. 4. First, in step A, a preliminary range 1 of scanning is located. The preliminary range 1 is determined from the rim toward the center of the scanner window 10. The preliminary range 1 is an area covering the illuminator 21 and the document D located within the scanner window 10. Because the background color of the pressing cover 20 is a single one (black or white), the regions of the document D and the illuminator 21 can be determined by color identification, which will be described later. FIGS. 5-1 to 5-5 are examples of preliminary ranges 1 for different locations of document D relative to the illuminator 21.

Since most documents are rectangular in shape, in order to speed up the recognition process, the area of the preliminary ranges 1 is also preferably rectangular and a minimum one including images of the illuminator 21 and the document D. The process for obtaining the preliminary ranges 1 of FIGS. 5-1 to 5-5 is illustrated with FIG. 6, for example.

Figure 6:
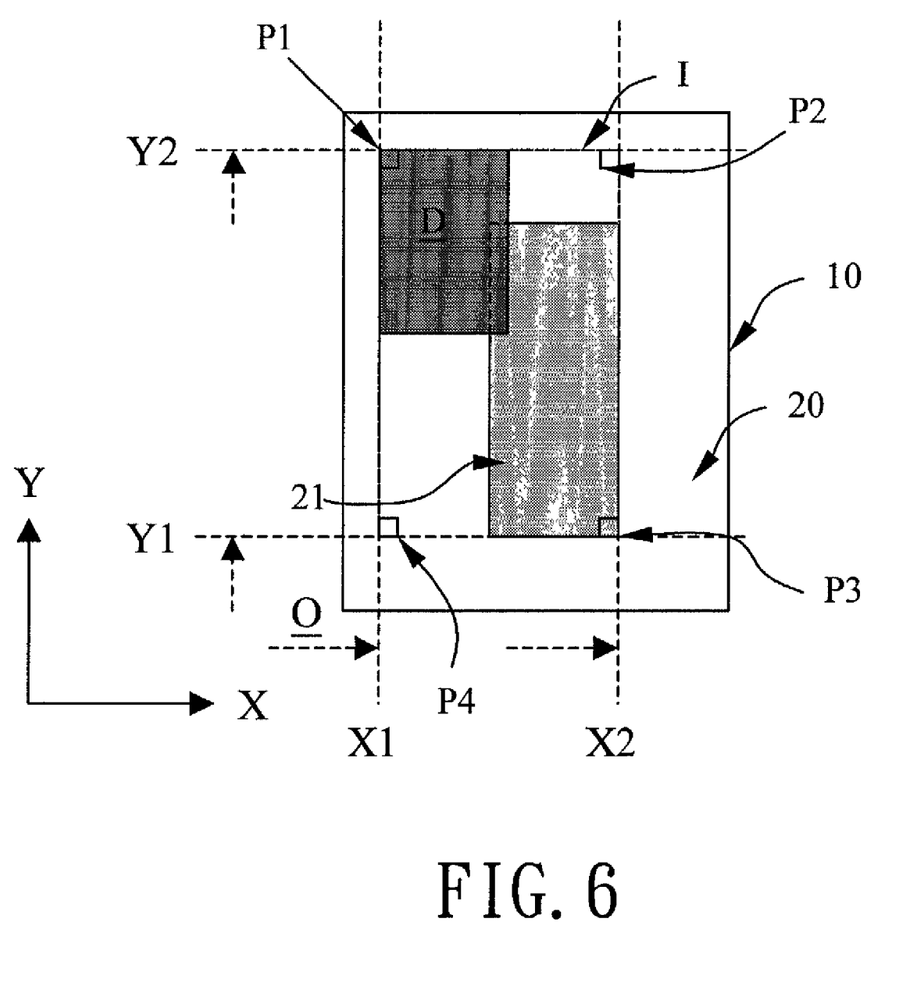
FIG. 6 is an example of locating a preliminary range of scanning.

As shown in FIG. 6, to beginning from one side of the scanned image, searches along one axis (for example, the X-axis) of the X-Y coordinates to verify the color of the pixels on each column. If the pixels in the whole column with the same X-coordinate have the same color as the background color of the pressing cover 20, then the next column is searched until a column of pixels that includes a different color, for example at column X1, is located. Then a rim X1 of the document D or the illuminator 21 is obtained. It further searches the following columns until the column Xe, where the whole column pixels revert to the color of the pressing cover 20. Then the column X2 (=Xe−1), which is the column before Xe, is determined to be the other rim of the preliminary range 1.

Using the same process as above to search along the other axis (for example, the Y-axis) of the X-Y coordinates and verify the color of the pixels on each row, the rim rows of the preliminary range 1 in Y-axis, marked Y1 and Y2, can also be obtained. Therefore, the coordinates of four corners of the preliminary range 1 are P1(X1,Y2), P2(X2,Y2), P3(X2,Y1) and P4(X1,Y1). In other words, the four points enclose a minimum area covering the document D and the illuminator 21 as the preliminary range 1.

Figure 4:
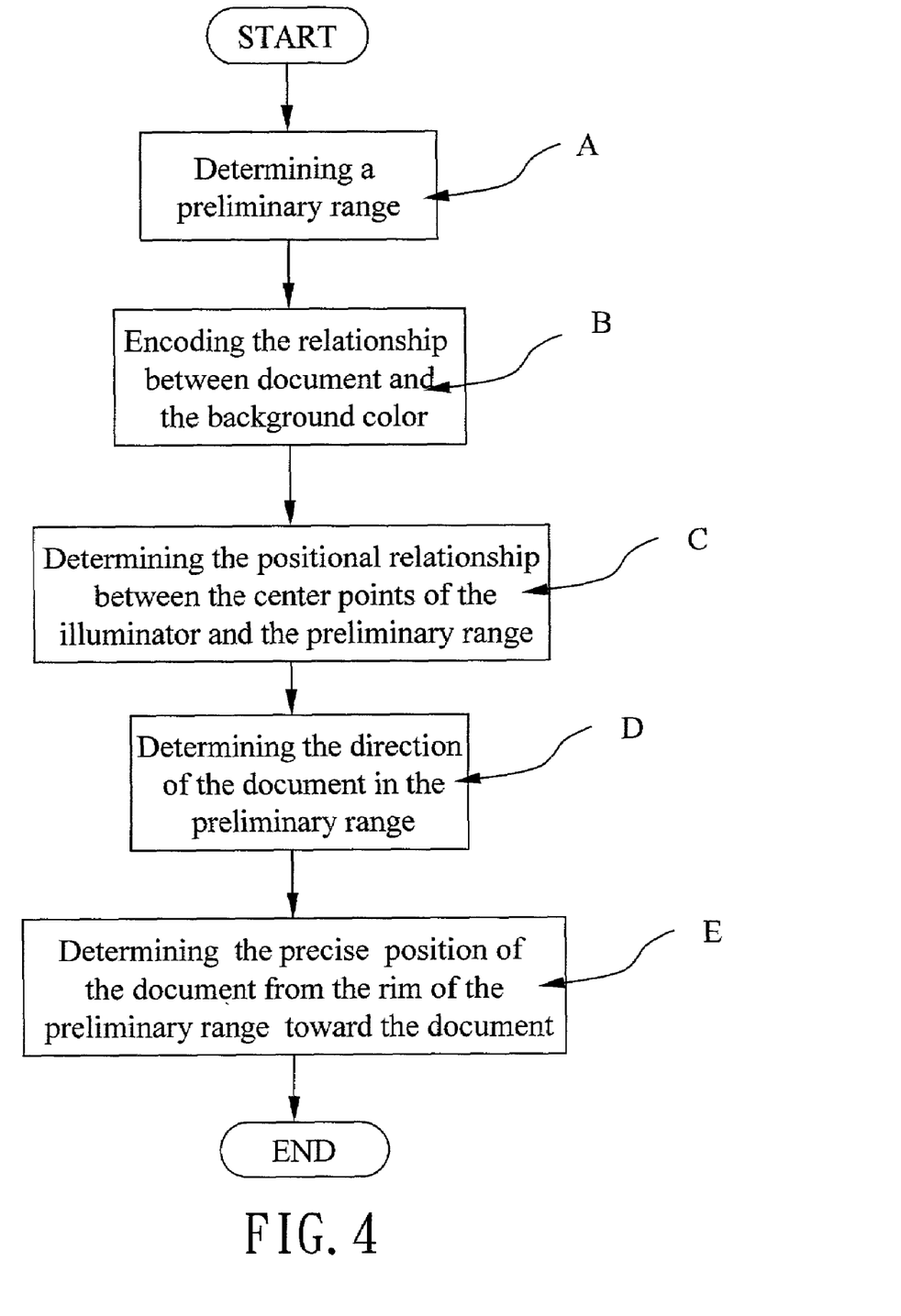
FIG. 4 is a flowchart showing the major steps of the invention.
Figure 7:
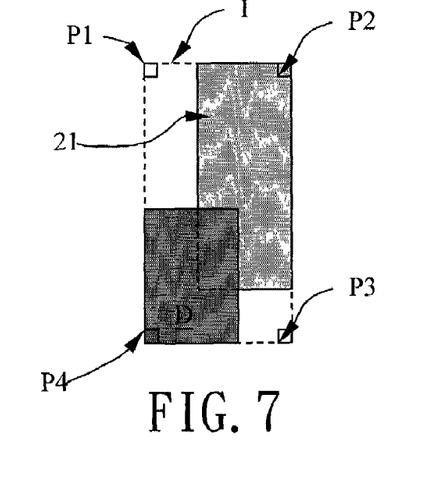
FIG. 7 shows four reference points at the corners of a preliminary range of scanning.
Figures 21, 22, 23:
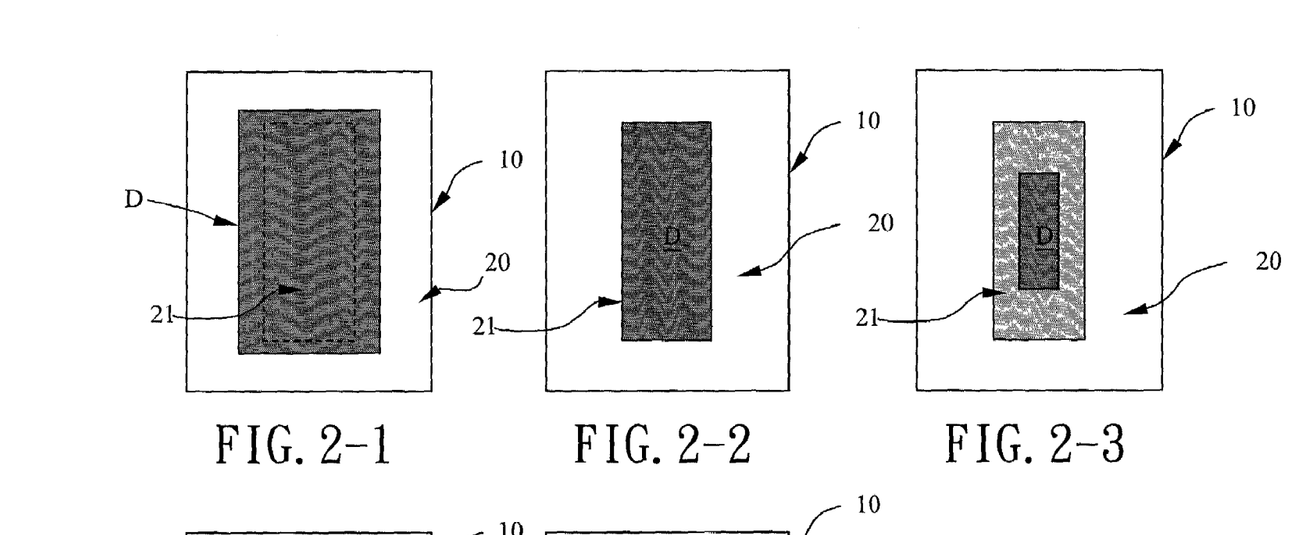

Steps B to E, as shown in FIG. 4, are used to determine the detailed position of the document D. In step B, the relationship between the document and the pressing cover 20 is encoded (converted into numerical codes). As shown in FIG. 7, the colors of the four corner points P1 to P4 of the preliminary range 1 are registered with numerical codes, so that "1" represents the same color as the pressing cover 20, and "0" represents a color different from that. Therefore, a serial number, like (0,0,0,1), indicates the position of the document D relative to the illuminator 21. FIGS. 8-1 to 8-28 are examples of the identification codes in accordance with the positional relationship between the document D and the illuminator 21.

Figures 91, 92, 825, 826, 827, 828:
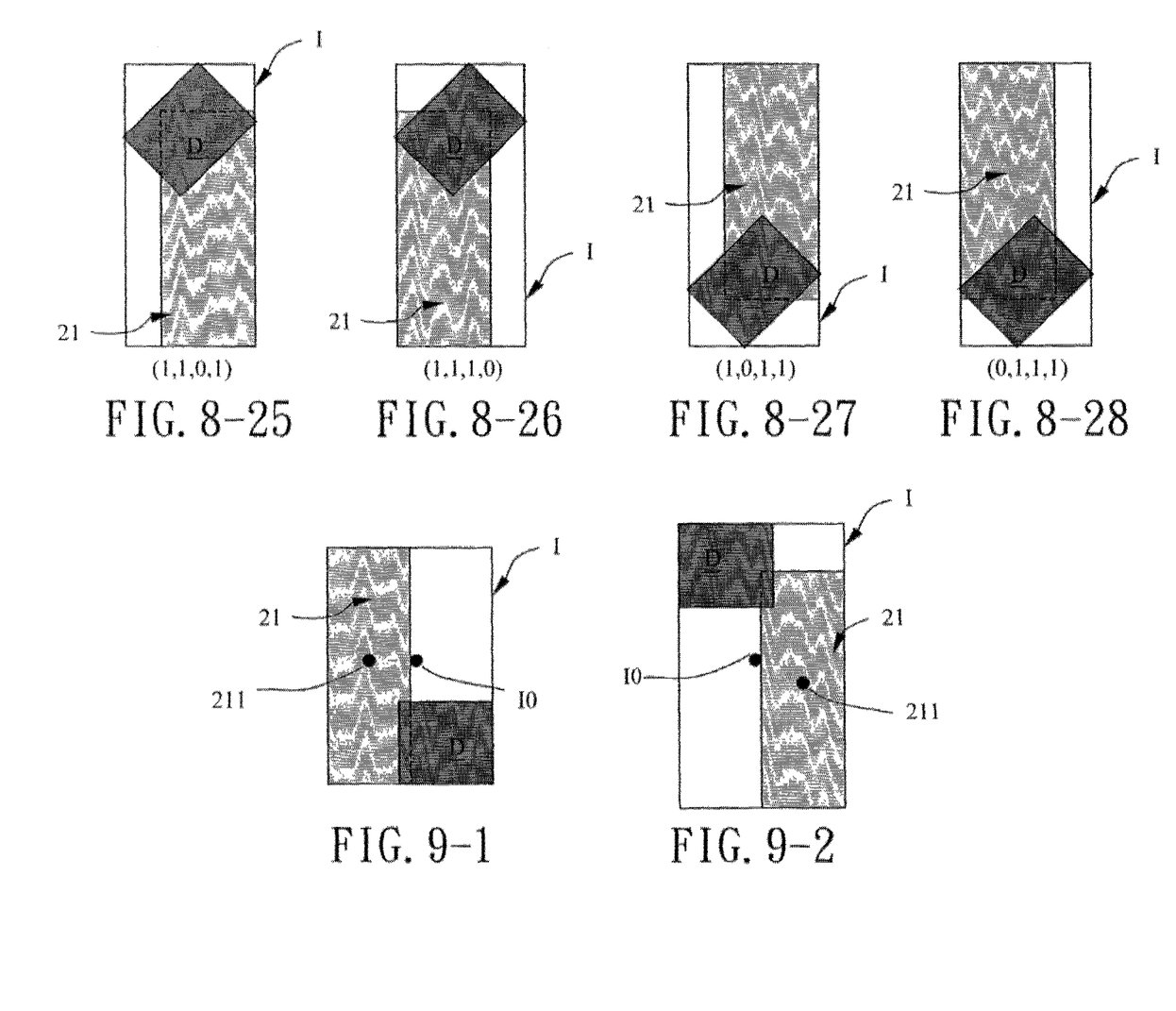

The step C is to determine the positional relationship between the center point 211 of the illuminator 21 and the center point 10 of the preliminary range 1. Since the physical position of the illuminator 21 is fixed, we can use the origin point "O" of the coordinates of the scanner window as the origin of the center point 10 of the preliminary range 1 and the center point 211 of the illuminator 21 so that the position of the preliminary range 1 relative to the illustrator 21 can be identified. For example, the coordinates of the center 211 of the illuminator 21 can be expressed as (Xm, Ym); the center point 10 of the preliminary range 1 can be calculated as $[(X2-X1)/2, (Y2-Y1)/2]$ from the corner coordinates thereof. The two points, as shown in FIGS. 9-1 and 9-2, can be used to determine the direction of the document D in the preliminary range 1.

Step D is to determine the direction of the document D in the preliminary range 1 for approaching the detailed position of the document D in the next step. The determination is based on the aforesaid identification codes of the document D and the illuminator 21 in the preliminary range 1, and the aforesaid coordinates of the centers 211, 10 of the illuminator 21 and the preliminary range 1. For example, in FIG. 9-1, the preliminary range 1 has an identification code of (0,1,0,0). The center point 10 of the preliminary range 1 is located at the right of the center point 211 of the illuminator 21. According to the positions of the four corners P1 to P4, the points P2 and P3 are located at the right side of the preliminary range 1. By referring to the values (1 and 0) of the points P2 and P3, we can judge that the document D is located at the lower right corner of the preliminary range 1 because P2=1 indicates that there is the background color of the pressing cover 20, and P3=0 indicates the existence of the document D. By the same process, the document D of FIG. 9-2 can be found at the upper left corner of the preliminary range 1.

FIGS. 8-1 to 8-4 show special positional relationships between the preliminary range 1 and the illuminator 21 in which the centers thereof overlap, and the identification codes are (0, 0, 0, 0) and (1, 1, 1, 1). In these conditions, the dimensions of the preliminary range 1 and the illuminator 21 have to be compared. In FIGS. 8-1 and 8-2, the identification codes are (0, 0, 0, 0), and the dimensions of the preliminary range 1 are the same as or larger than that of the illuminator 21. Therefore, the document D fully overlaps the preliminary range 1 or is smaller and is located in the center of the preliminary range 1. In FIGS. 8-3 and 8-4, the identification codes are (1, 1, 1, 1) and the width of the preliminary range 1 is larger or smaller than that of the illuminator 21. Therefore, the document D lies horizontally or vertically across the preliminary range 1.

Figures 101, 102, 103, 104, 105, 106:
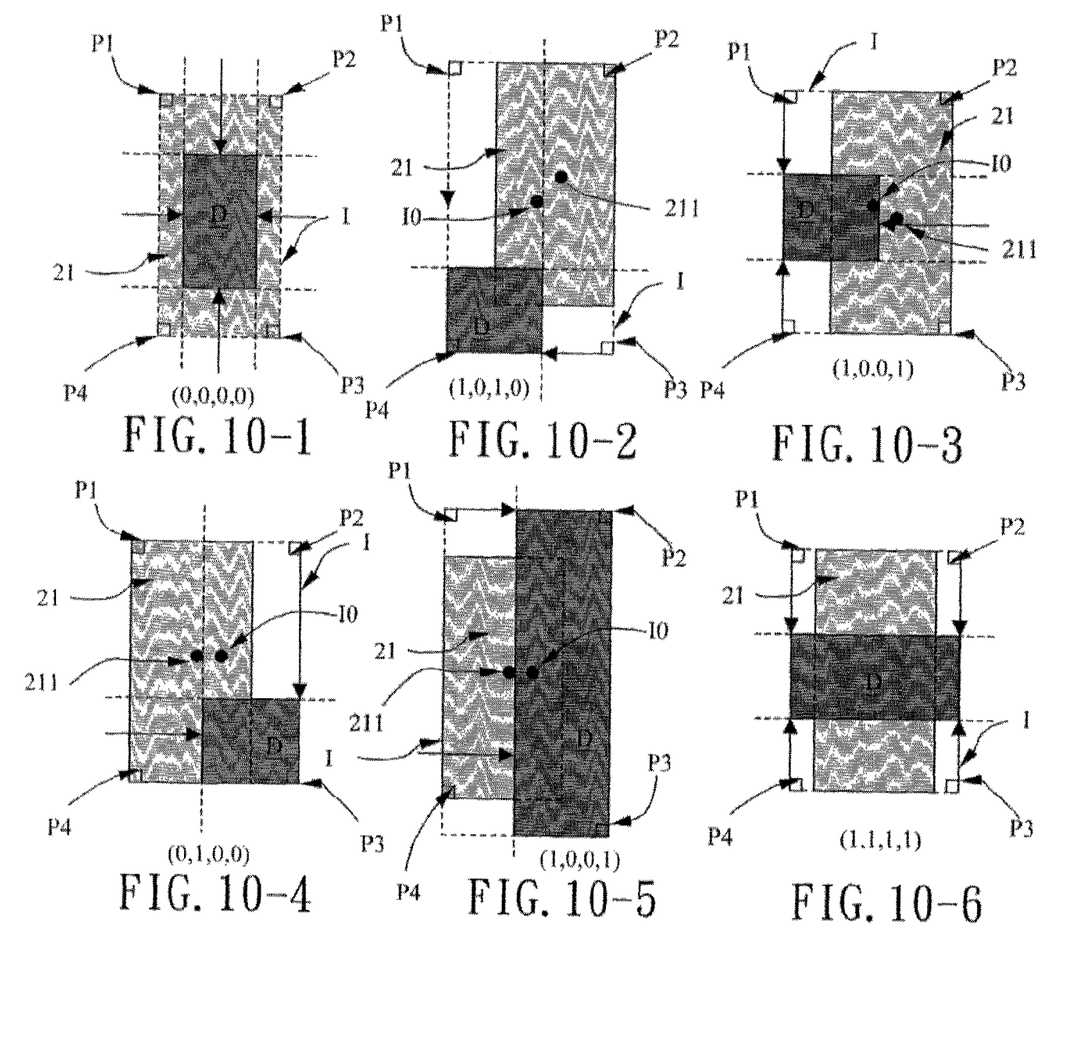
Figures 811, 812:
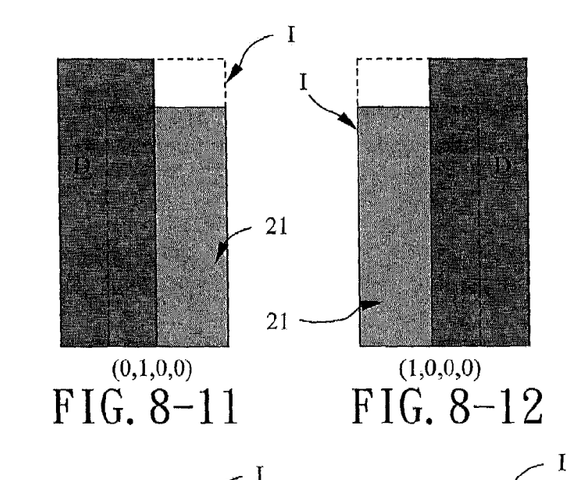
Figures 813, 814:
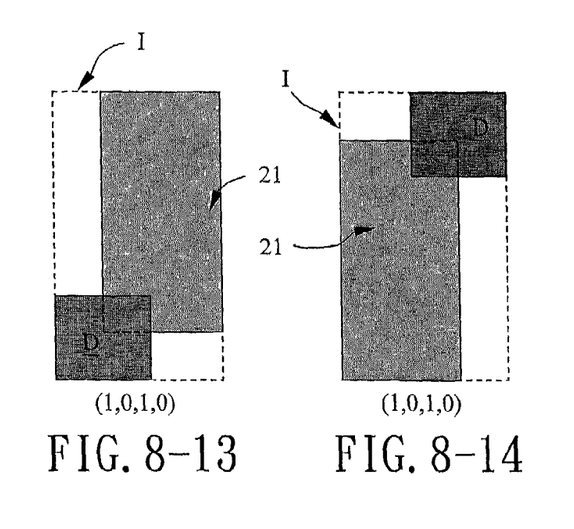
Figures 815, 816:
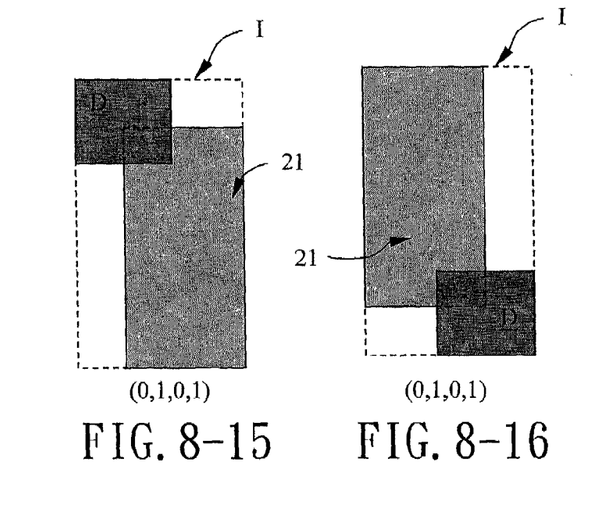
Figures 817, 818, 819, 820, 821, 822, 823, 824:
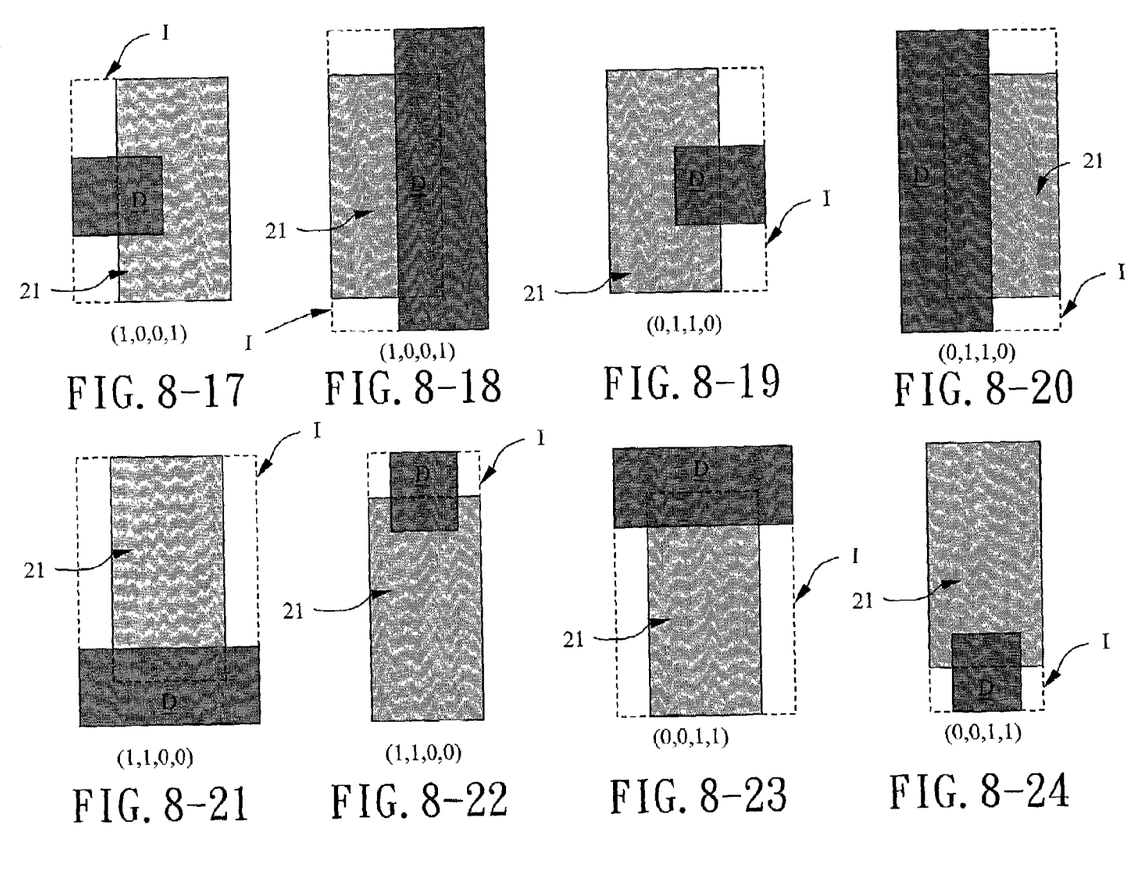

Step E is to determine the precise position of the document D by searching the boundary of the document D from the rim of the preliminary range 1 in the direction toward the document D. For example, in FIG. 10-1, the identification code based on the four corners P1 to P4 is (0, 0, 0, 0). The length and width of the document D are smaller than that of the illuminator 21. Therefore, the document D is located in the middle of the preliminary range 1. The precise position of the document D can be determined by searching downward from the top edge, upward from the bottom edge, leftward from the right edge and rightward from the left edge of the preliminary range 1. When the pixels of the image in each row or column include two or more colors, the edge of document D in that direction is found. After this process, the image portions of the illuminator 21 in the preliminary range 1 are cropped, and the portion of the document D is obtained.

In FIG. 10-2, the identification code based on the four corners P1 to P4 is (1, 0, 1, 0). The center point 10 of the preliminary range 1 is located in the lower-left side of the center point 211 of the illuminator 21. Therefore, the document D is located in the lower-left corner of the preliminary range 1. The precise position of the document D can be determined by searching downward from the top edge and leftward from the right edge of the preliminary range 1 to locate the top and right edges of the document D. When the pixels of the image in the row or column include two or more colors, the edge of document D in that direction is found. After the top and right edges of the document D are obtained, the two edges and the left and bottom edges of the preliminary range 1 determine the position of the document D.

In FIG. 10-3, the identification code based on the four corners P1 to P4 is (1, 0, 0, 1). The center point 10 of the preliminary range 1 is located on the left side of the center point 211 of the illuminator 21. Therefore, the document D is located on the left side of the preliminary range 1. The precise position of the document D can be determined by searching downward from the top edge, upward from the bottom edge and leftward from the right edge of the preliminary range 1 to locate the top, bottom and right edges of the document D. When the pixels of the image in the row or column include two or more colors, the edge of document D in that direction is found. After the top, bottom and right edges of the document D are obtained, the three edges and the left edge of the preliminary range 1 determine the position of the document D.

In FIG. 10-4, the identification code based on the four corners P1 to P4 is (0, 1, 0, 0). The center point 10 of the preliminary range 1 is located on the right side of the center point 211 of the illuminator 21. Therefore, the document D is located on the lower-right corner of the preliminary range 1. The precise position of the document D can be determined by searching downward from the top edge and rightward from the left edge of the preliminary range 1 to locate the top and left edges of the document D. After the top and left edges of the document D are obtained, the two edges and the right and bottom edges of the preliminary range 1 determine the position of the document D.

In FIG. 10-5, the identification code based on the four corners P1 to P4 is (1, 0, 0, 1). The center point 10 of the preliminary range 1 is located on the right side of the center point 211 of the illuminator 21. Therefore, the document D is located on the right side of the preliminary range 1. The precise position of the document D can be determined by searching rightward from the left edge of the preliminary range 1 to find out the left edge of the document D. After the left edge of the document D is obtained, the left edge and the right, top and bottom edges of the preliminary range 1 determine the position of the document D.

In FIG. 10-6, the identification code based on the four corners P1 to P4 is (1, 1, 1, 1). The width of the preliminary range 1 is larger than the width of the illuminator 21. Therefore, the document D lies horizontally across the preliminary range 1. The precise position of the document D can be determined by searching downward from the top edge and upward from the bottom edge of the preliminary range 1 to locate the top and bottom edges of the document D. After the top and bottom edges of the document D are obtained, the two edges and the left and right edges of the preliminary range 1 determine the position of the document D.

As described above, the invention can correctly determine the precise position of a document from a pre-scanned image, including portions of the pressing cover, illuminator and the document.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method, comprising:
   obtaining a pre-scanned image from a scanner, the scanner having an illuminator to illuminate a document disposed on the scanner, wherein the pre-scanned image includes a document image portion, a background image portion, and an illuminator image portion comprising an image of at least a portion of the illuminator;
   determining a preliminary range of the pre-scanned image; distinguishing at least a portion of said document image portion and/or said background image portion from said illuminator image portion; and
   determining a position of the document image portion within the range of the pre-scanned image.

2. The method of claim 1 wherein said determining said preliminary range comprises locating one side of said pre-scanned image, and searching along the one side to identify at least one corner of the pre-scanned image.

3. The method of claim 1 wherein said distinguishing comprises indentifying color differences between said document image portion from said illuminator image portion.

4. The method of claim 1 wherein distinguishing comprises identifying one or more corners of the document image portion within the pre-scanned image.

5. The method of claim 4 wherein identifying one or more corners comprises identifying color differences between said document image portion and said background image portion at the one or more corners.

6. The method of claim 5 wherein identifying four corners further comprises identifying a center point of said document image portion.

7. The method of claim 5, wherein the document image portion and a background image portion comprise different colors.

8. The method of claim 7, further comprising distinguishing at least a portion of said document image portion from said background image portion.

9. The method of claim 1, and further comprising determining the positional relationship between said document image portion and said background image portion within the range of the pre-scanned image.

10. An apparatus, comprising:
    a scanner comprising:
    a scanner window adapted to have a document disposed thereon; and
    a scanner cover having an illuminator, wherein said scanner cover is adapted to press on a document disposed on the scanner window, wherein said scanner is further adapted to:

obtain a pre-scanned images, the pre-scanned image comnprising at least a portion of the document, at least a portion of the illuminator and at least a portion of the scanner cover;

determine a preliminary range of the pre-scanned image;

distinguish at least a portion of the pre-scanned image comprising said image of at least a portion of the document from said image of least a portion of the scanner cover and said image of at least a portion of the illuminator;

determine a position of the document portion within the preliminary range of the pre-scanned image.

11. The apparatus of claim 10, wherein the illuminator is adapted to illuminate at least a portion of a document disposed on the scanner window.

12. The apparatus of claim 10, wherein said determining a preliminary range comprises locating one side of said pre-scanned image, and searching along the one side to identify at least one corner of the pre-scanned image.

13. The apparatus of claim 10, wherein said scanner is further adapted to identify color differences between said document image portion, the illuminator image portion and scanner cover portion.

14. The apparatus of claim 10, wherein said scanner is further adapted to identify one or more corners of the document image portion within the pre-scanned image.

15. The apparatus of claim 14, wherein said scanner is further adapted to identify color differences between the document image portion, the illuminator image portion and the scanner cover image portion at the one or more corners.

16. The apparatus of claim 10. wherein said scanner is further adapted to identify a center point of said document portion.

17. The apparatus of claim 10, wherein the document image portion, the illuminator image portion and the scanner cover portion comprise different colors.

18. The apparatus of claim 11, wherein said illumiantor image portion and said scanner cover image portion comprise different colors.

19. The apparatus of claim 18, and further comprising distinguishing at least a portion of said illuminator image portion and said scanner cover image portion.

20. The apparatus of claim 10. and further comprising determining a positional relationship between said document image portion, said scanner cover image portion and said illuminator image portion within the preliminary range of the pre-scanned image.

* * * * *